US010704153B2

(12) United States Patent
Yang et al.

(10) Patent No.: US 10,704,153 B2
(45) Date of Patent: Jul. 7, 2020

(54) COPPER NANOPARTICLE STRUCTURES FOR REDUCTION OF CARBON DIOXIDE TO MULTICARBON PRODUCTS

(71) Applicants: Peidong Yang, Kensington, CA (US); Dohyung Kim, Albany, CA (US)

(72) Inventors: Peidong Yang, Kensington, CA (US); Dohyung Kim, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 390 days.

(21) Appl. No.: 15/840,435

(22) Filed: Dec. 13, 2017

(65) Prior Publication Data

US 2018/0209054 A1    Jul. 26, 2018

Related U.S. Application Data

(60) Provisional application No. 62/449,382, filed on Jan. 23, 2017.

(51) Int. Cl.
| | |
|---|---|
| *C25B 11/04* | (2006.01) |
| *C25B 11/12* | (2006.01) |
| *C25B 3/04* | (2006.01) |
| *C25B 1/00* | (2006.01) |
| *C01G 3/00* | (2006.01) |
| *H01M 4/90* | (2006.01) |
| *C09C 1/62* | (2006.01) |
| *B82Y 40/00* | (2011.01) |

(Continued)

(52) U.S. Cl.
CPC ............ *C25B 11/0447* (2013.01); *C01G 3/00* (2013.01); *C09C 1/627* (2013.01); *C25B 1/00* (2013.01); *C25B 3/04* (2013.01); *C25B 11/12* (2013.01); *H01M 4/9041* (2013.01); *B82Y 30/00* (2013.01); *B82Y 40/00* (2013.01); *C01P 2004/32* (2013.01); *C01P 2004/38* (2013.01); *C01P 2004/40* (2013.01); *C01P 2004/64* (2013.01); *H01M 8/083* (2013.01)

(58) Field of Classification Search
CPC ........ C25B 3/04; C25B 11/12; C25B 11/0447
See application file for complete search history.

(56) References Cited

U.S. PATENT DOCUMENTS

| | | |
|---|---|---|
| 7,659,224 B2 | 2/2010 | Shimazaki |
| 8,318,374 B2 | 11/2012 | Ino |

(Continued)

OTHER PUBLICATIONS

Bugayong, J. et al "Electrochemical Reduction of CO2 using Supported Cu2O Nanoparticles" ECS Transactions, 2013, p. 81-89. (Year: 2013).*

(Continued)

*Primary Examiner* — Brian W Cohen

(57) ABSTRACT

This disclosure provides systems, methods, and apparatus related to copper nanoparticle structures for reduction of carbon dioxide to multicarbon products. In one aspect, a method includes providing a plurality of copper nanoparticles. The plurality of copper nanoparticles are deposited on a support. The plurality of copper nanoparticles are transformed to a plurality of copper structures during an operation in which carbon dioxide is reduced. The plurality of copper nanoparticles on the support are used as a working electrode in an electrochemical cell during the operation.

20 Claims, 15 Drawing Sheets

(51) Int. Cl.
   *B82Y 30/00* (2011.01)
   *H01M 8/083* (2016.01)

(56) References Cited

U.S. PATENT DOCUMENTS 9,099,253 B2 8/2015 Adzic
9,421,518 B2 8/2016 Schuz
9,463,435 B2 10/2016 Schuz

OTHER PUBLICATIONS

Kim D, et al. (2014) Synergistic geometric and electronic effects for electrochemical reduction of carbon dioxide using gold-copper bimetallic nanoparticles. Nat Commun 5:4948.
Hung, L.-I., et al., Room-temperature formation of hollow $Cu_2O$ nanoparticles. Adv. Mater. 22, 1910-1914 (2010).
Wang Z, et al. (2016) Selectivity on etching: Creation of high-energy facets on copper nanocrystals for CO2 electrochemical reduction. ACS Nano 10:4559-4564.
Hori Y (2008) Electrochemical CO2 reduction on metal electrodes. Modern Aspects of Electrochemistry (Springer, New York), pp. 89-189.
Kuhl KP, et al. (2012) New insights into the electrochemical reduction of carbon dioxide on metallic copper surfaces. Energy Environ Sci 5:7050.
Kas R, et al. (2014) Electrochemical CO2 reduction on Cu2O-derived copper nanoparticles: Controlling the catalytic selectivity of hydrocarbons. Phys Chem Chem Phys 16:12194-12201.
Chen CS, et al. (2015) Electrochemical reduction of carbon dioxide to ethane using nanostructured Cu2O-derived copper catalyst and palladium(II) chloride. J Phys Chem C 119:26875-26882.
Kim D, et al. (2015) Insights into an autonomously formed oxygen-evacuated Cu2O electrode for the selective production of C2H4 from CO2. Phys Chem Chem Phys 17:824-830.
Chen CS, et al. (2015) Stable and selective electrochemical reduction of carbon dioxide to ethylene on copper mesocrystals. Catal Sci Technol 5:161-168.
Lee S, et al. (2015) Electrocatalytic production of C3—C4 compounds by conversion of CO2 on a chloride-induced bi-phasic Cu2O—Cu catalyst. Angew Chem Int Ed Engl 54:14701-14705.
Dutta A, et al. (2016) Morphology matters: Tuning the product distribution of CO2 electroreduction on oxide-derived Cu foam catalysts. ACS Catal 6:3804-3814.
Kwon Y, et al. (2016) CO2 electroreduction with enhanced ethylene and ethanol selectivity by nanostructuring polycrystalline copper. ChemElectroChem 3:1012-1019.
Loiudice A, et al. (2016) Tailoring copper nanocrystals towards C2 products in electrochemical CO2 reduction. Angew Chem Int Ed Engl 55:5789-5792.
Ren D, et al. (2015) Selective electrochemical reduction of carbon dioxide to ethylene and ethanol on copper(I) oxide catalysts. ACS Catal 5:2814-2821.
Ren D, et al. (2016) Mechanistic insights into the enhanced activity and stability of agglomerated Cu nanocrystals for the electrochemical reduction of carbon dioxide to n-propanol. J Phys Chem Lett 7:20-24.
Mistry H, et al. (2016) Highly selective plasma-activated copper catalysts for carbon dioxide reduction to ethylene. Nat Commun 7:12123.
Handoko AD, et al. (2016) Mechanistic insights into the selective electroreduction of carbon dioxide to ethylene on Cu2O-derived copper catalysts. J Phys Chem C 120:20058-20067.
Roberts FS, et al. (2015) High selectivity for ethylene from carbon dioxide reduction over copper nanocube electrocatalysts. Angew Chem Int Ed Engl 54:5179-5182.
Ren D, et al. (2016) Tuning the selectivity of carbon dioxide electroreduction toward ethanol on oxide-derived CuxZn catalysts. ACS Catal 6:8239-8247.
Gao D, et al. (2017) Plasma-activated copper nanocube catalysts for efficient carbon dioxide electroreduction to hydrocarbons and alcohols. ACS Nano 11:4825-4831.
Manthiram K, et al. (2014) Enhanced electrochemical methanation of carbon dioxide with a dispersible nanoscale copper catalyst. J Am Chem Soc 136:13319-13325.
Kim Y-G, et al. (2016) Regulating the product distribution of CO reduction by the atomic-level structural modification of the Cu electrode surface. Electrocatalysis 7:391-399.
Kim Y-G, et al. (2016) Surface reconstruction of pure-Cu single-crystal electrodes under CO-reduction potentials in alkaline solutions: A study by seriatim ECSTM-DEMS. J Electroanal Chem 780:290-295.
Mistry H, et al. (2016) Tuning catalytic selectivity at the mesoscale via interparticle interactions. ACS Catal 6:1075-1080.
Kim D, et al. (2017) Copper nanoparticle ensembles for selective electroreduction of CO2 to C2—C3 products. PNAS Oct. 3, 2017 vol. 114 No. 40 10560-10565.

* cited by examiner

FIG. 5A
FIG. 5C
FIG. 5E
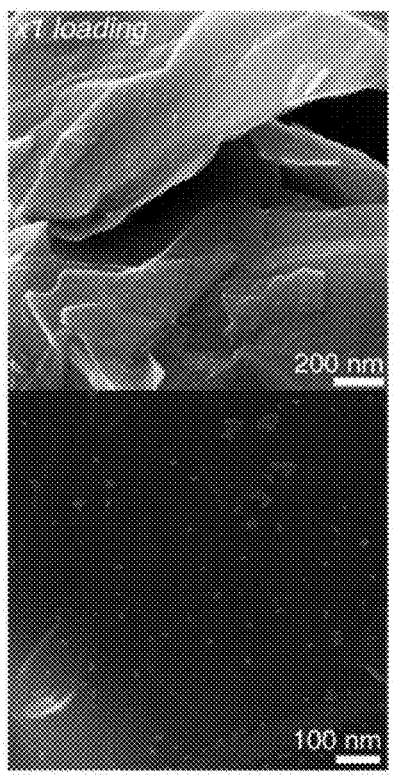
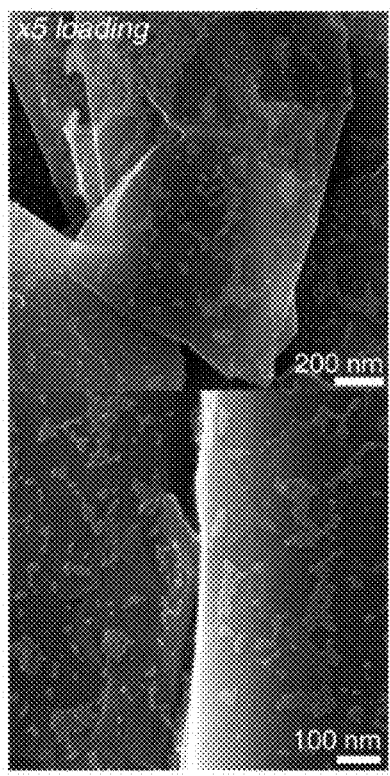
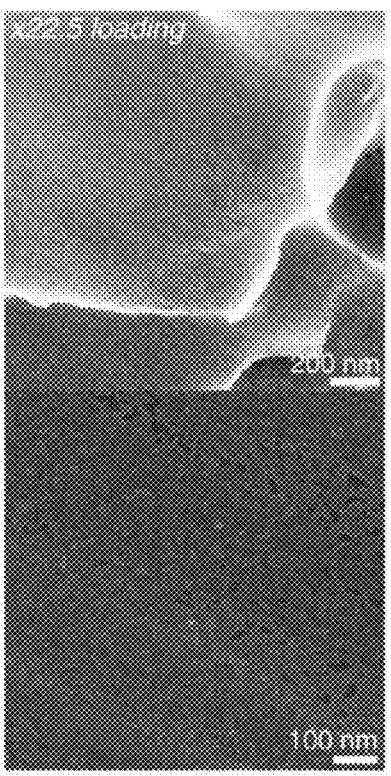
FIG. 5B
FIG. 5D
FIG. 5F

COPPER NANOPARTICLE STRUCTURES FOR REDUCTION OF CARBON DIOXIDE TO MULTICARBON PRODUCTS

RELATED APPLICATIONS

This application claims priority to U.S. Provisional Patent No. 62/449,382, filed Jan. 23, 2017, which is herein incorporate by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to catalysts and more particularly to copper-based catalytic materials.

BACKGROUND

With rising concerns about the anthropogenic impacts of current trends in energy use, as well as the prospect of continuing these trends to meet future needs, we are at a stage where revolutionary change to our energy paradigm is a must. Various methods for effectively using solar energy are being developed to power and support the global population. Among them, artificial photosynthesis is considered vital to meeting the goal of long-term global sustainability. The successful introduction of artificial photosynthesis technology will depend on the development of every functional component essential to the efficient operation of the overall system.

As energy from sunlight eventually ends up in chemical bonds by the photocatalytic or electrocatalytic component, development of an effective catalytic material to facilitate the conversion process becomes important. Over the past several decades, the focus has been on using water as the starting substrate and converting it to hydrogen gas. More recently, carbon dioxide has been considered as a promising substrate, and many efforts have been underway to find efficient electrocatalysts that can selectively operate for reducing $CO_2$ in aqueous solutions against the competing hydrogen evolution. However, major progress has been limited to two-electron reduced products of CO and formate. Still, the formation of multicarbon products involving multiple proton and electron transfers remains as one of the biggest scientific challenges to be addressed.

SUMMARY

One innovative aspect of the subject matter described in this disclosure can be implemented in a method including providing a plurality of copper nanoparticles. The plurality of copper nanoparticles are deposited on a support. The plurality of copper nanoparticles are transformed to a plurality of copper structures during an operation in which carbon dioxide is reduced. The plurality of copper nanoparticles on the support are used as a working electrode in an electrochemical cell during the operation.

Another innovative aspect of the subject matter described in this disclosure can be implemented in a method including providing an electrochemical cell. The electrochemical cell includes a working electrode comprising a plurality copper nanoparticles disposed on a support. Carbon dioxide is reduced using the electrochemical cell. A plurality of copper structures are created on the support. Each of the plurality of copper structures comprise a portion of the plurality of copper nanoparticles.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 5A-5F shows SEM images of Cu NPs loaded on carbon-paper support at ×1 loading, ×5 loading, and ×22.5 loading.

FIG. 6D shows separation of the NPs from their initial densely packed assembly. FIG. 6E shows the use of Cu nanocubes as starting materials. FIG. 6F shows a change of support to a low surface area carbon plate. FE of $C_1$, $C_2$, and $C_3$ products obtained from trans-CuEn (left column, shaded, at −0.81 V vs. RHE) are compared with the activity measured for three different conditions [at (i) −0.84 V, (ii) −0.86 V, and (iii) −0.81 V vs. RHE, respectively] in FIG. 6G. Electrochemical tests were conducted using 0.1 M $KHCO_3$ solution at 1 atmosphere $CO_2$.

FIG. 7A shows FE of $C_1$, $C_2$, and $C_3$ products at various potentials for trans-CuEn. FIG. 7B shows FE of major products at various potentials for trans-CuEn. Electrochemical tests were conducted using 0.1 M $KHCO_3$ solution at 1 atmosphere $CO_2$. Error bars shown are 1 SD from three independent measurements.

FIG. 8A shows FE of $C_1$, $C_2$, and $C_3$ products at various potentials. FIG. 8B shows FE of major products at various potentials. FIG. 8C shows relative ratio of the FE. FIG. 8D shows logarithmic specific current density (corrected by the real surface area of the catalyst) plots for $C_2H_4$, EtOH, and n-PrOH. Electrochemical tests were conducted in 0.1 M $CsHCO_3$ solution at 1 atm $CO_2$. Error bars shown are 1 SD from three independent measurements. FIG. 8E shows long-term electrolysis at −0.75 V vs. RHE with gas products measured every hour. FIG. 8F shows FE of EtOH and n-PrOH measured after electrolysis and $C_1$, $C_2$, and $C_3$ product FEs for the overall run.

DETAILED DESCRIPTION

Figure 1:
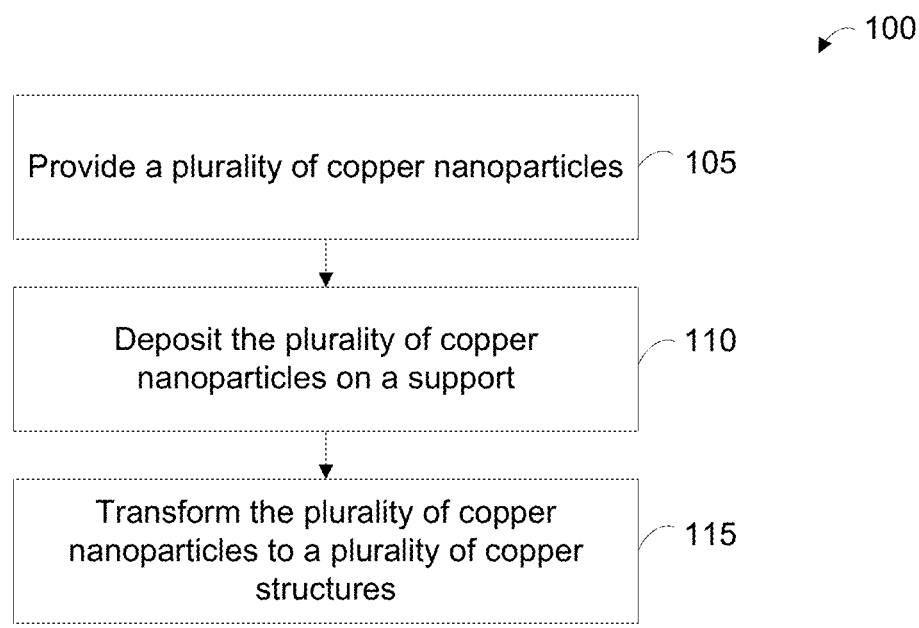
FIG. 1 shows an example of a flow diagram illustrating a process for fabricating an electrode for an electrochemical cell for carbon dioxide reduction.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

Starting from the idea that elemental copper is a key component to forming multicarbon products, there have been various studies where the formation of products such as $C_2H_4$, $C_2H_6$, and $C_2H_5OH$ has been observed often with the requirement of large overpotentials (potential applied ≤−1 V vs. RHE). These methods mostly rely on reducing certain forms of oxidized copper (either oxides or halides). This approach has been extended to reduce carbon monoxide instead, a common intermediate for $CO_2$ reduction, to circumvent difficulties associated with C—C coupling starting from $CO_2$. Furthermore, to instead create a favorable environment for multicarbon product formation, there have been attempts to use gas-diffusion electrodes with alkaline electrolytes. It would be desirable to discover an electrocatalyst that can directly reduce $CO_2$ to multicarbon products with high selectivity and energy efficiency (i.e., minimal energy loss from low overpotentials).

As described herein, an ensemble of densely packed copper nanoparticles (NPs) can enable selective conversion of $CO_2$ to multicarbon products, while significantly suppressing $C_1$ formation. Catalytically active cube-like structures, capable of forming ethylene, ethanol, and n-propanol, are formed during electrolysis by the structural transformation of the Cu NP ensemble. These structures can selectively generate $C_2$ and $C_3$ products together at low overpotentials in neutral pH aqueous media, illustrating the importance of in situ structural evolution in $CO_2$ electrocatalysis. The catalyst support also plays an important role for high multicarbon selectivity. This work suggests an alternative route to development of catalysts for multicarbon products and understanding of their formation, where the field has been heavily reliant on using oxidized copper as starting materials.

FIG. 1 shows an example of a flow diagram illustrating a process for fabricating an electrode for an electrochemical cell for carbon dioxide reduction. Starting at block 105 of the method 100, a plurality of copper nanoparticles is provided. In some embodiments, copper nanoparticles of the plurality of copper nanoparticles are approximately spherical. In some embodiments, copper nanoparticles of the plurality of copper nanoparticles have a diameter of about 2 nanometers (nm) to 20 nm, about 5 nm to 20 nm, or about 2 nm to 3 nm. In some embodiments, copper nanoparticles of the plurality of copper nanoparticles are monodisperse or substantially monodisperse. That is, copper nanoparticles of the plurality of copper nanoparticles are all about the same size.

The plurality of copper nanoparticles may be fabricated using different methods. In some embodiments, the plurality of copper nanoparticles are fabricated using a colloidal synthesis method. For example, one colloidal synthesis method includes the reduction of copper (I) acetate at high temperatures, as described further in the EXAMPLES.

In colloidal synthesis, ligands are disposed on surfaces of the plurality of copper nanoparticles after synthesis. The plurality of copper nanoparticles may be washed after synthesis. During washing, the plurality of copper nanoparticles should remain stable in solution such that copper nanoparticles do not aggregate. The washing also should remove any residual organic compounds from the synthesis method. In some embodiments, the plurality of copper nanoparticles are washed in a solution comprising chloroform and acetone (e.g., 1 part by volume chloroform to 3 parts acetone by volume). For example, to wash the copper nanoparticles, the copper nanoparticles may be dispersed in a solution and then centrifuged (e.g., about 12,000 rpm for 10 minutes). The copper nanoparticles may be washed one, two, three, or more times. After washing, the copper nanoparticles then may be dispersed in a solvent or an organic solvent (e.g., hexane).

At block 110, the plurality of copper nanoparticles is deposited on a support. For example, when the copper nanoparticles are dispersed in a solvent (e.g., hexane), the copper nanoparticles may be drop cast on the support. In some embodiments, the solvent wets the support.

In some embodiments, the support comprises a planar support. In some embodiments, the support comprises a carbon support. In some embodiments, the support comprises carbon paper. As used herein, carbon paper refers to flat sheets of material that are manufactured from carbon fibers. As used herein, carbon paper does not refer to the carbon paper used for copying text. Carbon paper has a high surface area. On a microscopic scale, the surfaces of the carbon paper have peaks and troughs due to carbon fibers being woven together (e.g., similar to cloth). In some embodiments, the carbon paper is about 100 microns to 300 microns thick. In some embodiments, the carbon paper comprises or consists of carbon fibers and plates of graphite. In some embodiments, the plates of graphite are about 100 nm to 200 nm thick. In some embodiments, the plates of graphite have edges having lengths of about 1 micron to 2 microns. In some embodiments, the carbon paper comprises or consists of carbon fibers.

In some embodiments, a loading of the plurality of copper nanoparticles on the support is about $2.5 \times 10^{11}$ particles per square centimeter (particles/cm$^2$) to $8.2 \times 10^{12}$ particles/cm$^2$. The particles per unit area listed in the previous sentence are referenced to the actual, true area of the support and not the geometrically projected area of the support. For example, when the support comprises carbon paper, the geometrically projected area of the carbon paper may be about 1 centimeter (cm) by 1 cm. However, the carbon paper would have a higher actual, true area due to the microstructure of the carbon paper. The number of nanoparticles of the plurality of copper nanoparticles on the support may be specified such that plurality of copper nanoparticles may form a layer of copper nanoparticles that covers surfaces of the support without large numbers of copper nanoparticles being stacked on top of one another. In some embodiments, surfaces of the support have copper nanoparticles disposed thereon. For example, a front side and a back side of the support may have copper nanoparticles disposed thereon. After any solvent that the plurality of nanoparticles was dispersed in has been removed (e.g., by evaporation) from the plurality of copper nanoparticles on the support, the structure is ready for use as an electrode in an electrochemical cell.

At block 115, the plurality of copper nanoparticles is transformed to a plurality of copper structures during an operation in which carbon dioxide is reduced. The plurality of copper nanoparticles on the support are used as a working electrode in an electrochemical cell during this operation. In some embodiments, after a period of time (e.g., about 5 minutes) in which the plurality of copper nanoparticles is transformed to a plurality of copper structures, carbon dioxide is reduced and multicarbon products are generated. In some embodiments, the multicarbon products are selected from a group consisting of ethylene, ethanol, and propanol. In some embodiments, the multicarbon products consist of ethylene, ethanol, and propanol. Further details regarding the electrochemical operation and the electrochemical cell are given below in the descriptions of FIGS. 3 and 4.

Figure 2A:
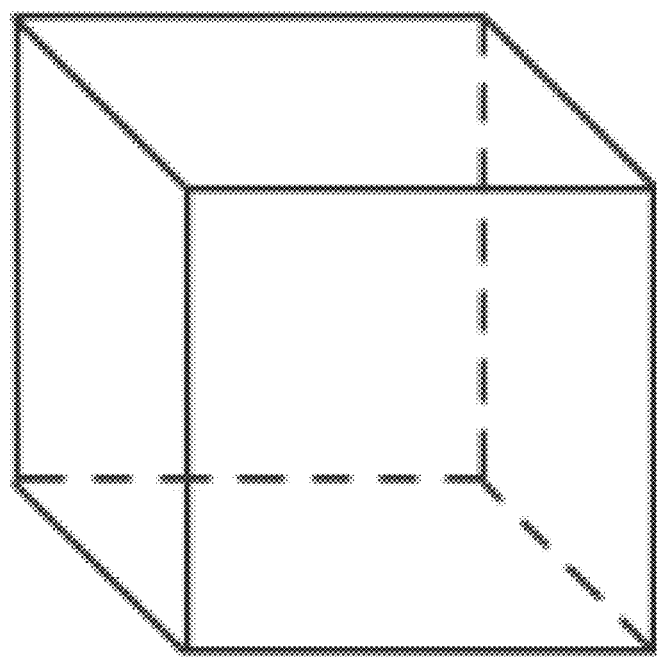
FIG. 2A shows an example of a diagram of a cube.
Figure 2B:
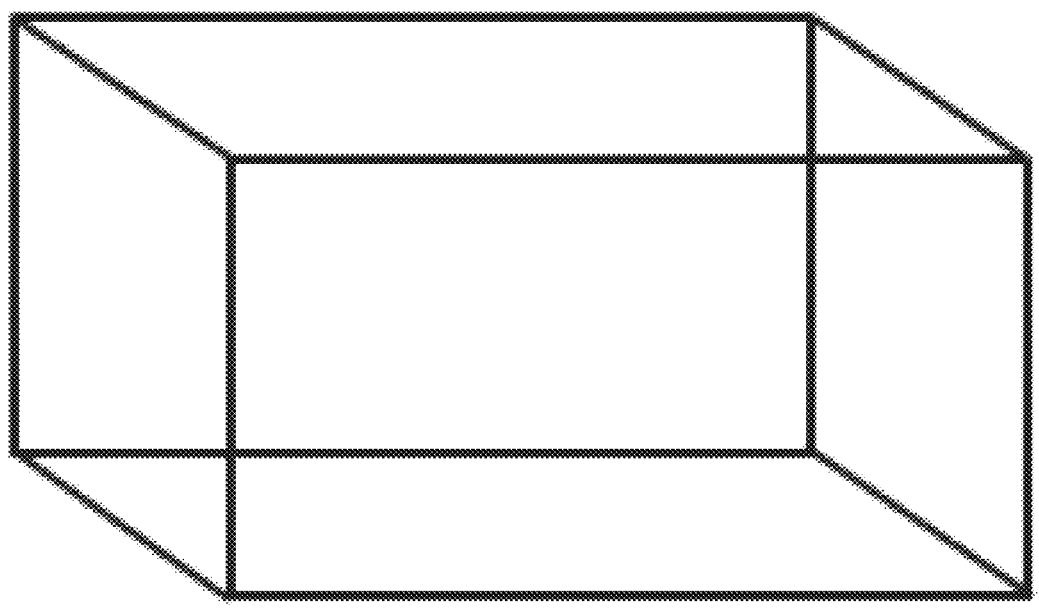
FIG. 2B shows an example of a diagram of a right rectangular prism.

In some embodiments, the plurality of copper structures are disposed on the support. In some embodiments, the plurality of copper structures comprise cubes and right rectangular prisms. FIG. 2A shows an example of a diagram of a cube. In geometry, a cuboid is a convex polyhedron bounded by six quadrilateral faces. In a rectangular cuboid, all angles are right angles, and opposite faces of a cuboid are equal. By definition this makes it a right rectangular prism, and the terms rectangular parallelepiped or orthogonal parallelepiped are also used to designate a rectangular cuboid. FIG. 2B shows an example of a diagram of a right rectangular prism. In some embodiments, sides of the cubes and the right rectangular prisms have a length of about 10 nm to 75 nm or about 20 nm to 50 nm.

Figure 3:
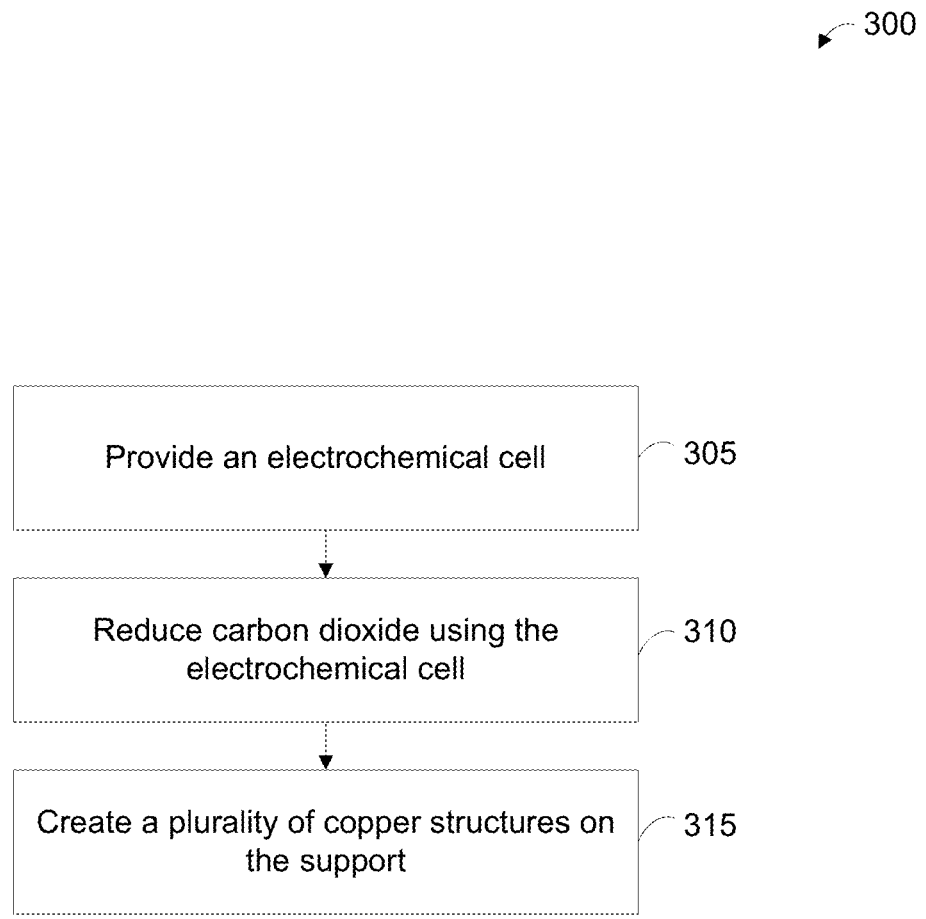
FIG. 3 shows an example of a flow diagram illustrating a process for reducing carbon dioxide.

FIG. 3 shows an example of a flow diagram illustrating a process for reducing carbon dioxide. Starting at block 305 of the method 300, an electrochemical cell is provided. The electrochemical cell includes a working electrode comprising a plurality copper nanoparticles disposed on a support. In some embodiments, the support comprises carbon paper. In some embodiments, the plurality copper nanoparticles disposed on a support cover the surfaces of the support. In some embodiments, copper nanoparticles of the plurality of copper nanoparticles are approximately spherical. In some embodiments, copper nanoparticles of the plurality of copper nanoparticles have a diameter of about 2 nm to 20 nm. The electrode at block 305 of the method 300 may be similar to or the same as electrode at block 110 of the method 100 shown in FIG. 1.

Figure 4:
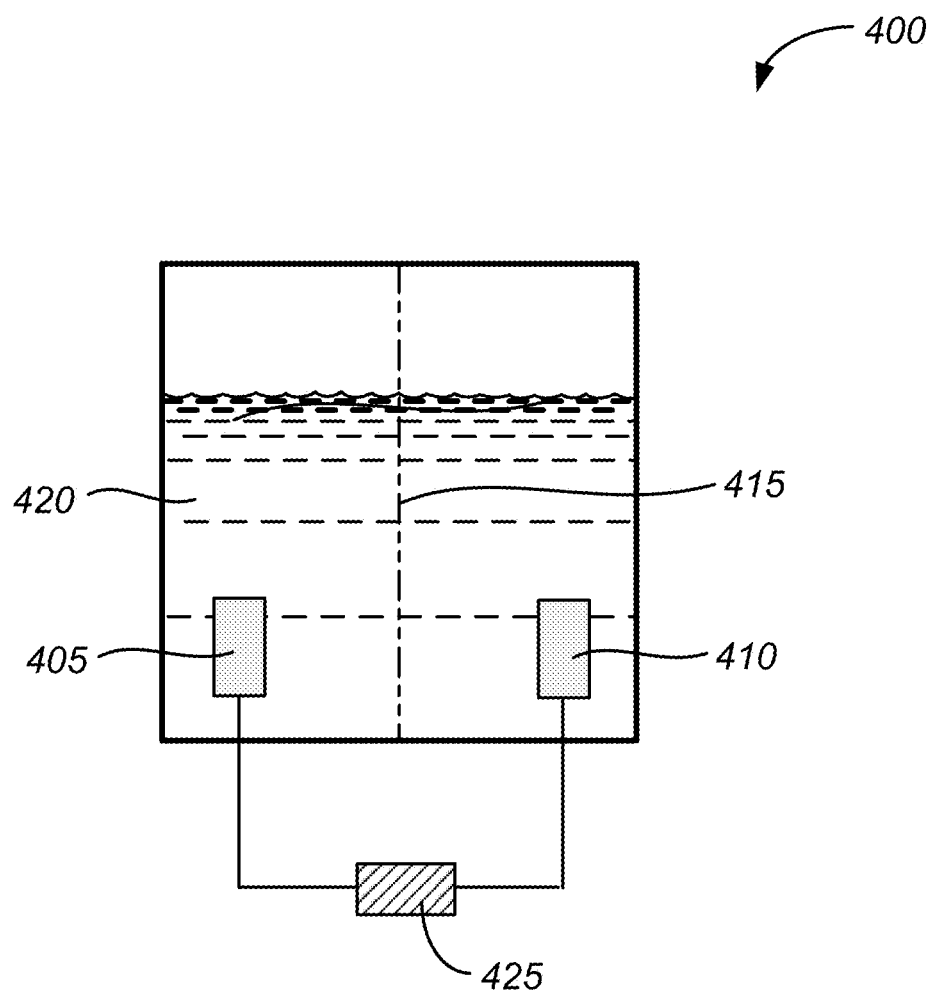
FIG. 4 shows an example of a schematic diagram of an electrochemical cell.

FIG. 4 shows an example of a schematic diagram of an electrochemical cell. The electrochemical cell 400 shown in FIG. 4 could be used in the method 300 described with respect to FIG. 3. The electrochemical cell 400 includes a working electrode 405, a counter electrode 410, and an anion exchange membrane 415 (e.g., Selemion, from AGC Engineering Co., LTD., Chiba, Japan) separating the working electrode 405 and the counter electrode 410. An electrolyte 420 is used in the electrochemical cell as a medium through which ions are transported between the working electrode 405 and the counter electrode 410. The electrochemical cell 400 also includes a power source 425 (e.g., a DC power source) to drive an electrochemical reaction.

In some embodiments, the working electrode 405 comprises a plurality copper nanoparticles disposed on a support. In some embodiments, copper nanoparticles of the plurality of copper nanoparticles have a diameter of about 2 nm to 20 nm. In some embodiments, the support comprises carbon paper. In some embodiments, the counter electrode 410 comprises platinum, carbon, a metal oxide, or a metal hydroxide. In some embodiments, the electrolyte 420 comprises a bicarbonate, such as potassium bicarbonate or cesium bicarbonate, for example. When in operation, carbon dioxide can be bubbled through the chamber including the working electrode 405.

Returning to FIG. 3, at block 310, carbon dioxide is reduced using the electrochemical cell. For example, a voltage may be applied between the working electrode and the counter electrode drive the reduction of carbon dioxide.

In some embodiments, the voltage applied between the working electrode and the counter electrode comprises a step-function of voltage or a voltage step. In some embodiments, no voltage is applied to the working electrode and the counter electrode before the step-function of voltage is applied to the working electrode and the counter electrode. For example, no voltage sweeps (i.e., linear sweep voltammetry) are performed with the electrochemical cell before the application of the step-function of voltage. That is, in some embodiments, the first voltage applied between the working electrode and the counter electrode consists of a step-function of voltage. It is believed that the step-function of voltage aides in the formation of the plurality of copper structures at block 315.

At block 315, a plurality of copper structures are created on the support. After the voltage is applied to the working electrode and the counter electrode, the plurality of copper structures are created in about 5 minutes or less. Each of the plurality of copper structures comprises a portion of the plurality of copper nanoparticles. In some embodiments, the plurality of copper structures comprise cubes and right rectangular prisms. In some embodiments, sides of the cubes or the right rectangular prisms have a length of about 10 nm to 75 nm or about 20 nm to 50 nm. Each of the plurality of copper structures has no specific orientation with respect to the support. The initial stages of the electrochemical reaction of reducing carbon dioxide forms the plurality of copper structures. It is believed that the copper structures enable the generation of multicarbon products at the working electrode at low overpotentials.

The electrode formed by the methods 100 and 300 comprises a support with a plurality of copper structures disposed on surfaces of the support. In some embodiments, the support comprises carbon paper. In some embodiments, the carbon paper comprises or consists of carbon fibers and plates of graphite. In some embodiments, the carbon paper comprises or consists of carbon fibers.

Each of the plurality of copper structures comprises a plurality of copper nanoparticles. In some embodiments, individual copper nanoparticles (i.e., single copper nanoparticles) and agglomerations of copper nanoparticles also are disposed on the support. In some embodiments, copper nanoparticles of the plurality of copper nanoparticles are substantially spherical. In some embodiments, copper nanoparticles of the plurality of copper nanoparticles have a diameter of about 2 nm to 20 nm, about 5 nm to 20 nm, or about 2 nm to 3 nm.

In some embodiments, the plurality of copper structures comprise cubes and right rectangular prisms. In some embodiments, sides of the cubes and the right rectangular prisms have a length of about 10 nm to 75 nm or about 20 nm to 50 nm.

In some embodiments, the method 300 further comprises generating multicarbon products by reducing carbon dioxide. In some embodiments, the multicarbon products are selected from a group consisting of ethylene, ethanol, and propanol. In some embodiments, the multicarbon products consist of ethylene, ethanol, and propanol.

While not wanting to be bound to any theory, the plurality of copper structures (referred to as reduction structures in this paragraph) that allow for the reduction of carbon dioxide and the generation of multicarbon products at a low overpotential, as described further in the EXAMPLES, may not be cubes or right rectangular prisms. The reduction structures that form from the plurality of copper nanoparticles are metallic copper in character. The cubes and right rectangular prisms may be structures that are formed from the reduction structures after the carbon dioxide reduction reaction is stopped. The reduction structures may oxidize to form cuprous oxide ($Cu_2O$), for example, and transform to the cubes or the right rectangular prisms.

EXAMPLES

The following examples are intended to be examples of the embodiments described herein, and are not intended to be limiting.

Monodisperse Cu NPs (size 6.7 nm) were synthesized by reducing copper precursors at high temperatures with tetradecylphosphonic acid used as surface ligands. Specifically, Cu nanoparticles were synthesized by the reduction of copper (I) acetate (CuAc). CuAc and tetradecylphosphonic acid (TDPA) were added to pre-heated (e.g., 130° C. for 30 minutes under nitrogen atmosphere) trioctylamine solvent at room temperature. While stirring and keeping it under $N_2$, the solution was heated to 180° C. and then to 270° C., with 30 minute periods at each temperature point. Subsequently, the heat source was disconnected and the solution was cooled to 100° C. Ethanol was added and the solution mixture was centrifuged at 6000 rpm for 15 minutes. Separated nanoparticles were washed with chloroform and acetone mixtures and then redispersed in hexane The Cu NPs were deposited by directly loading the particles in solution onto carbon paper supports (1 $cm^2_{geo}$) to form densely packed NP ensembles. Cu NP loading was systematically increased starting from the lowest loading of ~2 µg of Cu (×1). Number density of NPs was determined based on the estimated surface area of the carbon paper support, which was at ~5.9 $cm^2_{real}/cm^2_{geo}$ (roughness factor ~5.9). Most of the NPs were isolated at the lowest loading condition, and increased loadings resulted in densely packed arrangements of Cu NPs (FIGS. 5A-5F). In the case of ×22.5 loading, the surface was mostly covered with closely packed Cu NPs.

In the characterization of Cu NPs deposited on carbon paper described below, the electrodes were tested for electrochemical reduction of carbon dioxide in neutral pH aqueous environments (0.1 M $KHCO_3$ or $CsHCO_3$ at 1 atmosphere $CO_2$), with products measured by gas chromatography and NMR. Original copper NPs and the structures formed during electrolysis were characterized by various methods, including electron microscopy, X-ray photoelectron spectroscopy, and cyclic voltammetry.

Figure 5G:
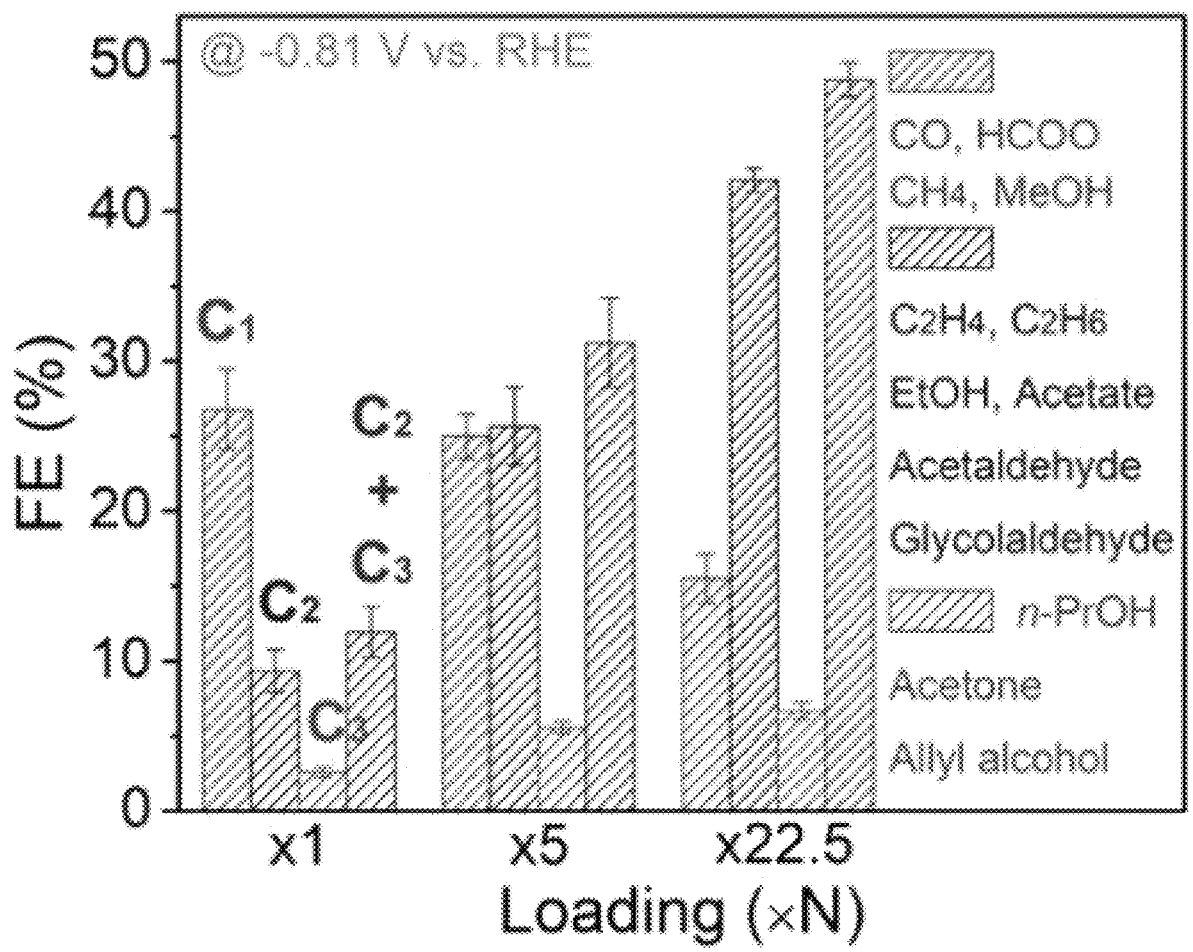
FIG. 5G shows FEs (%) for $C_1$, $C_2$, and $C_3$ products.
Figure 5H:
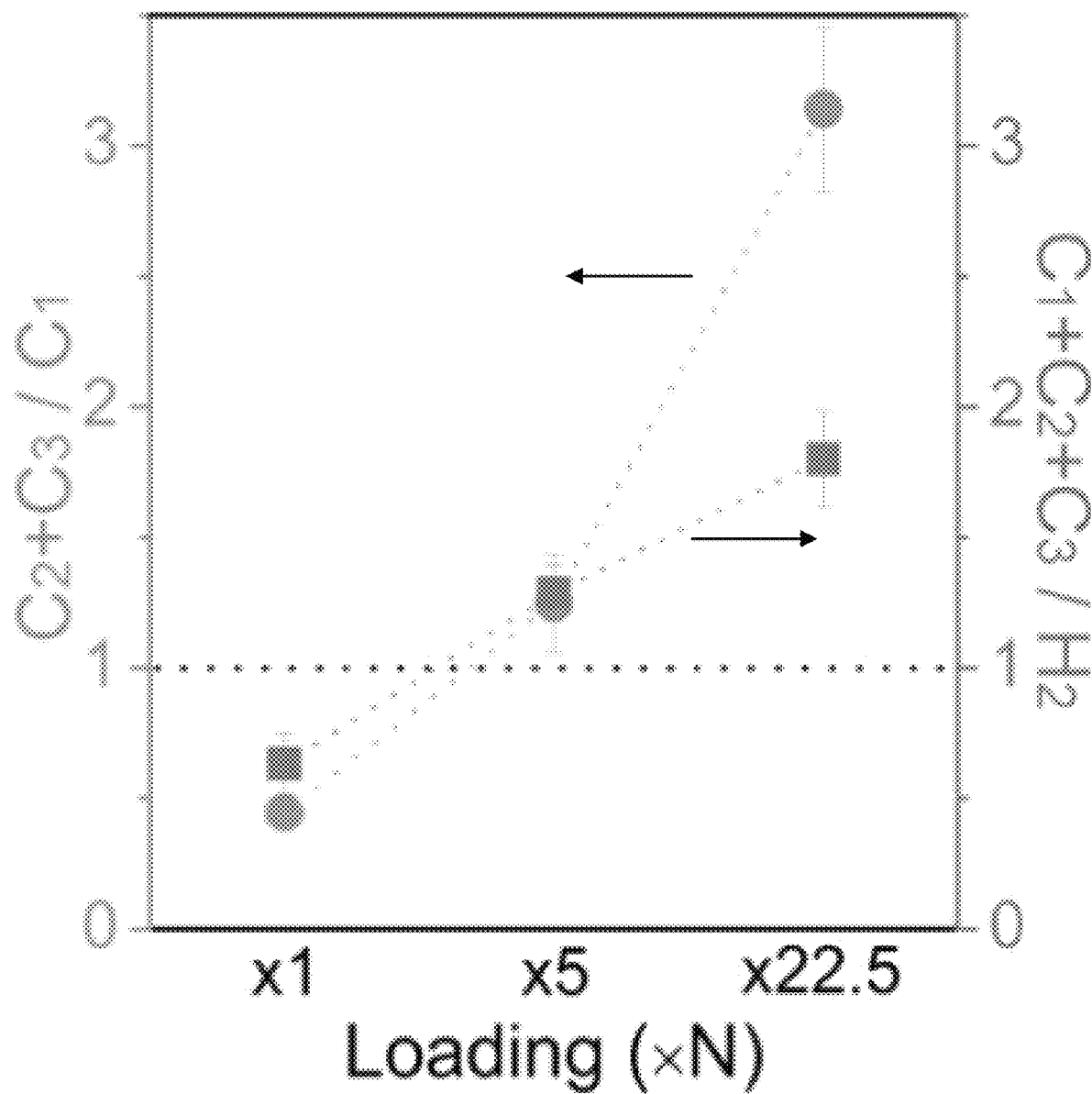
FIG. 5H shows relative ratio of the FEs.
Figure 5I:
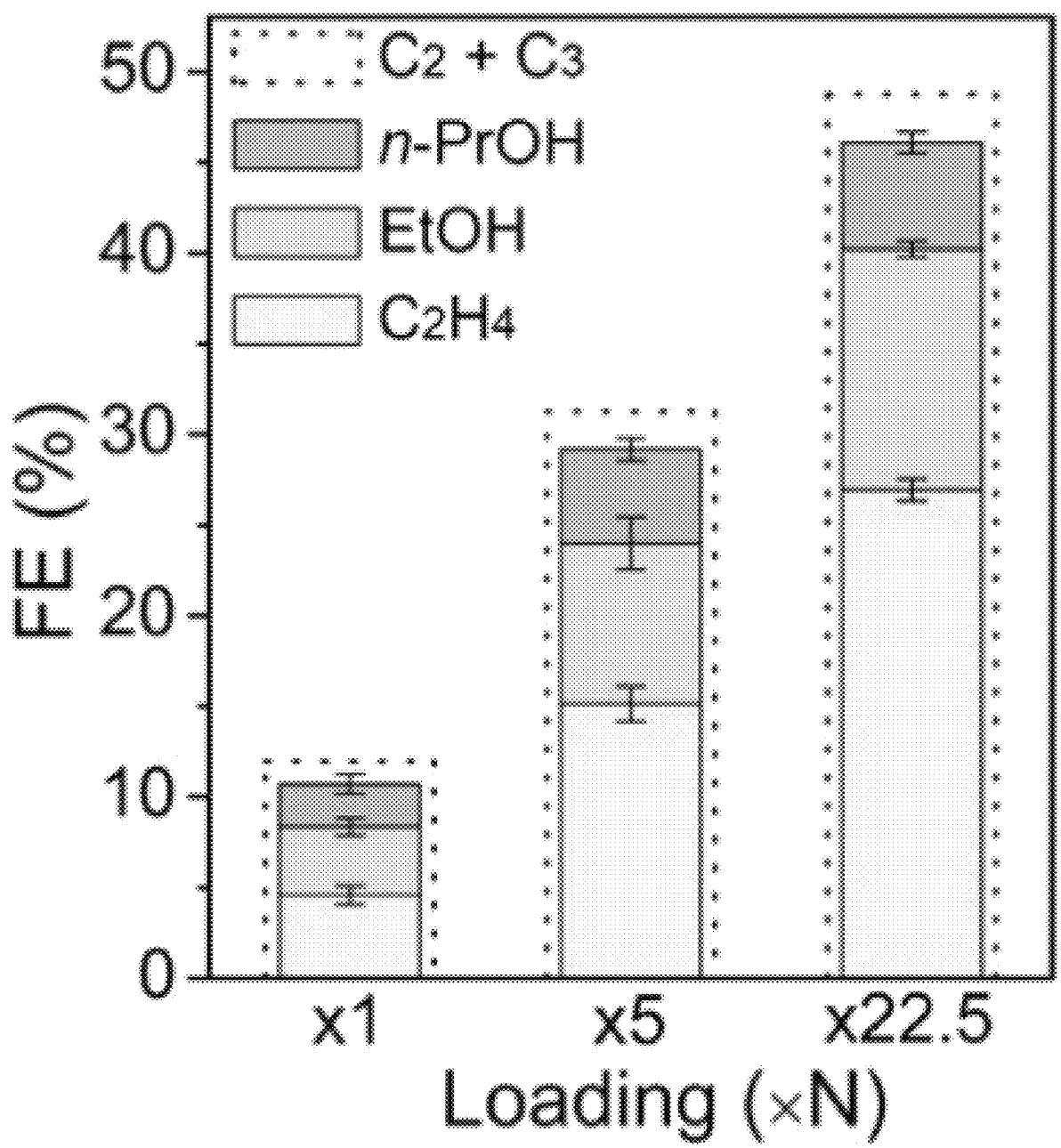
FIG. 5I shows ethylene, ethanol, and n-propanol FE with the dotted line showing the overall $C_2$-$C_3$ FE. Activity measured at −0.81 V vs. RHE, using 0.1 M $KHCO_3$ saturated under 1 atmosphere $CO_2$. Error bars shown in FIGS. 5G-5I are 1 SD from three independent measurements.

Cu NP ensembles with varied loading densities were tested for their electrocatalytic $CO_2$ reduction activity, under identical conditions of 0.1 M $KHCO_3$ at 1 atmosphere $CO_2$. From product analysis, increased loadings resulted in a rise of the $C_2$-$C_3$ faradaic efficiency (FE) (FIG. 5G). This trend is consistent with the observed loss of $C_1$ products, indicating that carbon-based intermediates could be effectively coupled to yield multicarbon products. When plotting the relative ratio of the $C_2$-$C_3$ FE to $C_1$ FE (FIG. 5H), charge consumed to reduce $CO_2$ was mainly from the reaction pathways to $C_2$-$C_3$ products at increased loading conditions, reaching up to 76% out of the total $CO_2$ reduction products. Similar trends can be seen with $CO_2$ reduction dominating over the competing $H_2$ evolution (FIG. 5H). Among various $C_2$-$C_3$ products, ethylene ($C_2H_4$), ethanol (EtOH), and n-propanol (n-PrOH) were the majority, constituting 94% out of the total $C_2$-$C_3$ products generated (FIG. 5I).

Figure 6A:
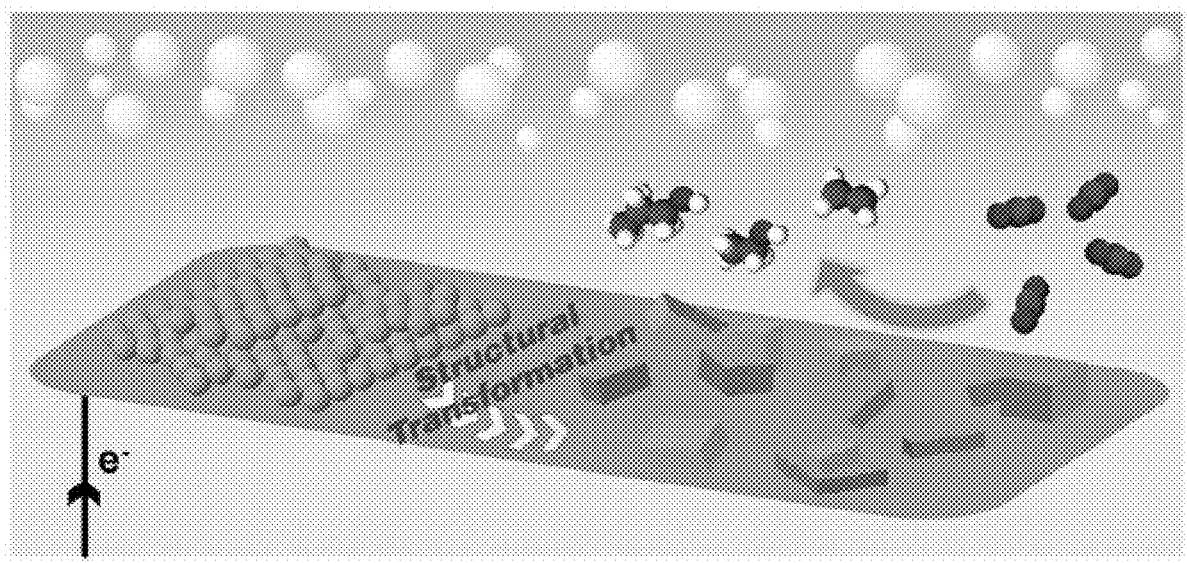
FIG. 6A shows a schematic diagram illustrating the transformation process of Cu NP ensembles to an active catalyst for $C_2$-$C_3$ product formation.
Figure 6B:
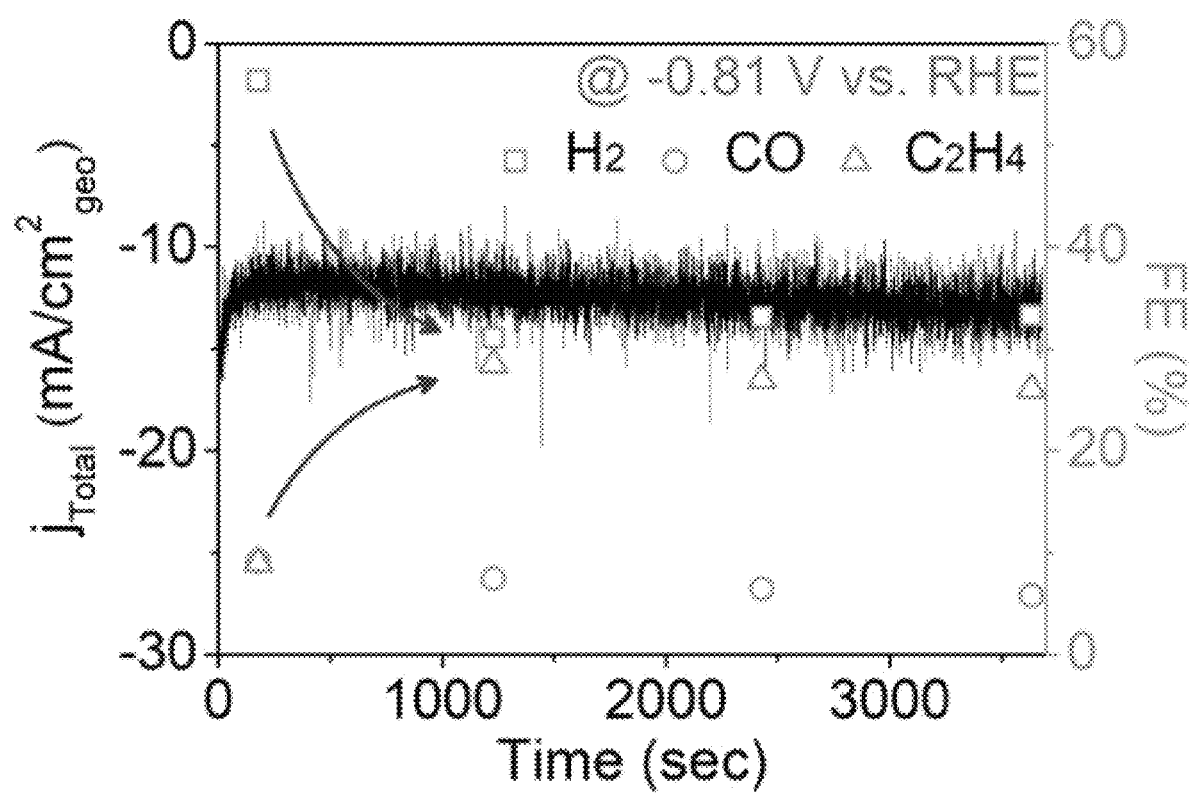
FIG. 6B shows total current density (based on geometric area) versus time for ×22.5 loading condition at −0.81 V vs. RHE. FE of gas products are shown at the time point of measurement. FE of $CH_4$ and $C_2H_6$ are omitted because of their low values.

When probing the product distribution over time for the ×22.5 loading condition, an abrupt change occurred during the initial period (FIG. 6B). Hydrogen was the dominant product when gas products were measured 3 minutes after the start of electrolysis. Selectivity for $C_2H_4$ increased afterward. A similar trend was found for the liquid products as well, where liquids analyzed for the first 7 minutes in had less multicarbon products relative to formate. Visual inspection of the electrode also supported the fact that product distribution was shifting during its initial electrochemical testing, as more gas bubbles were observed at the beginning of electrolysis, probably due to the majority of charge being consumed for two-electron transfer products, such as hydrogen.

Figure 6C:
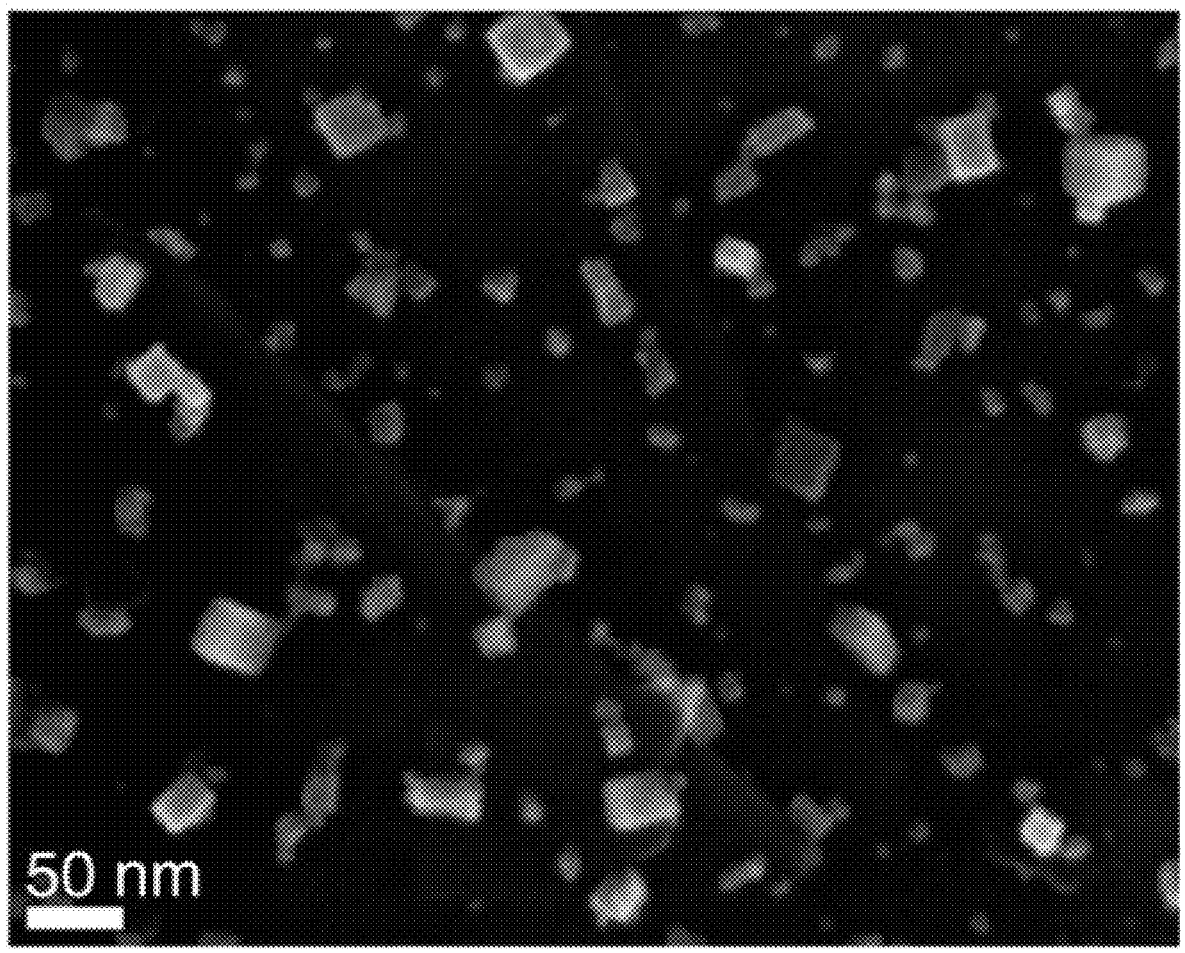
FIG. 6C shows a SEM image of ×22.5 loaded carbon-paper support electrode after 7 min of electrolysis at −0.81 V vs. RHE.
Figure 6D:
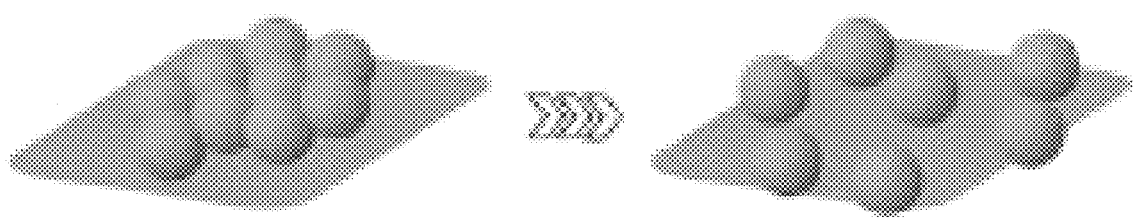
FIGS. 6D-6F show schematic diagrams illustrating an investigation of the parameters affecting structural transformation of Cu NP ensembles and their catalytic activity. Three different conditions have been tested.
Figure 6E:
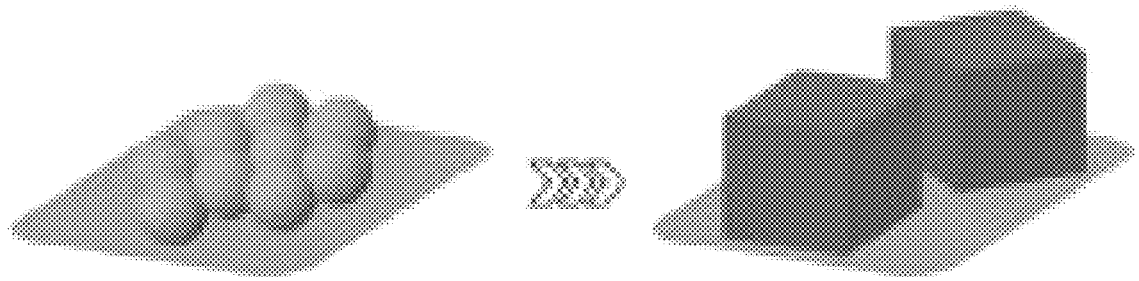
Figure 6F:
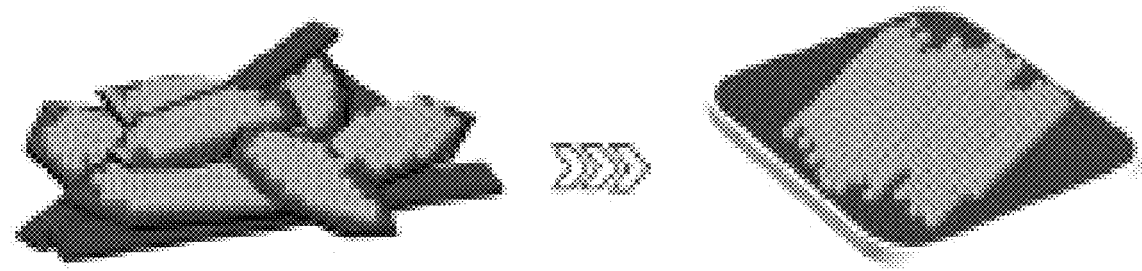

This observation indicated that the NP ensemble may go through a structural transformation process during initial electrolysis. Instead of the starting densely packed Cu NPs (×22.5 loading, FIGS. 5E and 5F), cube-like particles (10–40 nm) mixed together with smaller NPs were observed on the carbon support after electrolysis. Carbon-paper supports with lower loading were also checked after electrolysis and a trend could be observed: the more densely packed the Cu NPs, the more likely the formation of cube-like particles. When Cu NPs were sparsely covering the support, random aggregates of NPs together with the pristine NPs could be found after electrolysis. Surface-area analysis of Cu NP ensembles after electrolysis also showed that the densely packed NPs transformed to larger particles. As expected, loss of surface ligands during electrolysis and structural transformation was confirmed by elemental analysis. Structural transformation of the NP ensemble (FIG. 6A) occurred during the initial stage of electrolysis. This was confirmed from observation of the electrode 7 minutes after the start of electrolysis (FIG. 6C), which coincided with the shift in catalytic activity (FIG. 6B). Negligible catalytic activity of the underlying carbon paper further supports that the structure derived from Cu NP ensembles is responsible for enhanced $C_2$-$C_3$ formation. This catalytically active structure formed starting from densely packed Cu NP ensembles (×22.5 loading on carbon-paper support in 0.1 M $KHCO_3$), hereafter referred to as trans-CuEn, was further investigated.

As the initial loading density of Cu NP ensembles (and their densely "packed-ness") tends to govern their structural transformation during electrolysis and resulting electrochemical activity, intentionally separating the Cu NPs in the precursor state to trans-CuEn was attempted. It was expected the transformation process to cube-like structures to be disrupted, leading to diminished $C_2$-$C_3$ selectivity. Cu NPs (×22.5 loading) were mixed with carbon black before depositing on carbon-paper support, which led to NPs being spatially separated from each other. Under this condition, substantial loss of $C_2$-$C_3$ product selectivity (FE from 49 to 17%) was observed (FIG. 6G), while CO and $HCOO^-$ became major products. When particles were examined after electrolysis, the structure more resembled what would be observed for low-density conditions. Cu NPs have been observed to electrically fuse into irregularly shaped large crystals under strong bias conditions (<−1.25 V vs. RHE), reaching a similar state irrespective of the initial conditions. Here, it was found that structural transformation can be caused not only under low bias conditions, but controlled by the initial arrangement of NPs, and consequently catalytic behavior for multicarbon products can be significantly improved.

Figure 6G:
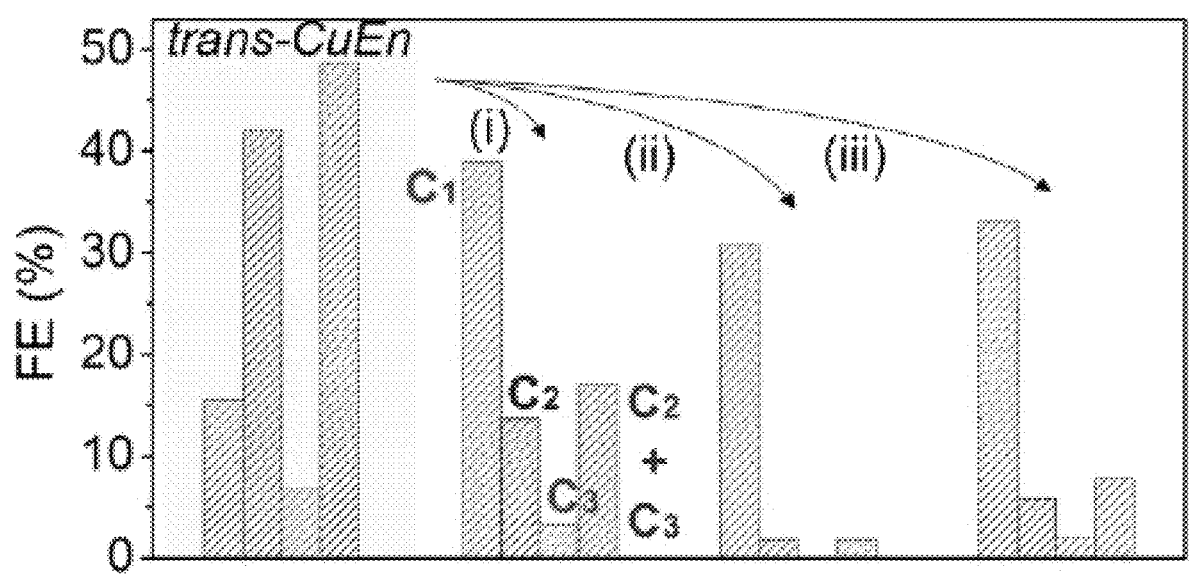

As trans-CuEn displays cubic-shaped particles, copper nanocubes loaded onto carbon-paper support were tested under identical conditions for comparison. Cu nanocubes that have been previously studied for $CO_2$ reduction were used. Specifically, cubes with edge length 25 nm were used (with copper loading mass identical to trans-CuEn) to approximately match the cubic-shaped particles that vary in size (10 nm to 40 nm) for trans-CuEn. In contrast to trans-CuEn, observed structural changes were minimal where the cubes seem to have sintered or roughened. Furthermore, only small amounts of multicarbon products were detected (FIG. 6G). The result is consistent with the earlier report of Cu nanocubes, which claims multicarbon product formation at high overpotentials (<−1 V vs. RHE). Thus, simple reproduction of the key morphological feature present in trans-CuEn is insufficient to reach high multicarbon selectivity.

This leads to the possibility of cube-like particles derived in situ during electrolysis featuring unique active sites for $C_2$-$C_3$ formation. A scanning tunneling microscopy investigation of copper for carbon monoxide reduction has shown not only the reconstruction of a polycrystalline surface to a (100) surface, but also the additional structural transformation unique to the (100) reconstructed copper, leading to stepped surfaces which selectively generate ethanol. While this observation may have been for reducing CO, together with the findings here, it brings to attention the importance of in situ structural transformation for multicarbon product formation in copper-based catalysts. In addition, it should be noted that while the vast majority of research has been to use oxide-derived structures, with some reports claiming the importance of remaining oxidized copper, the catalytically active structure derived here is from pristine Cu NPs (with a thin layer of surface oxide naturally present). Furthermore, it was found that the structural transformation observed is unique to the original Cu NPs. Therefore, it would be important to understand how this structural transformation proceeds and what type of active site motifs are present under working conditions. This is especially the case for copper, which may oxidize after electrolysis, possibly leading to the loss of surface atomic information. However, it cannot ruled out the possibility that high multicarbon selectivity stems from having a mixture of particles, which are the cube-like ones together with smaller particles. With all of these taken into consideration, further investigation into the structural origin of high multicarbon selectivity from Cu NP ensembles is needed.

Furthermore, the role of the catalyst support by depositing Cu NPs onto a highly polished graphite plate (1 $cm^2_{real}$, roughness factor ~1) was investigated, while keeping the NP density (/$cm^2_{real}$) identical to that of trans-CuEn. Structural transformation occurred in a similar way resulting in cubic-shaped particles. However, $H_2$ and $C_1$ products were the major products (FIG. 6G). This difference may be due to local pH effects discussed in earlier reports, as the loss in the real surface area of the underlying support led to a sharp decrease of the geometric current density (lowered to ≈⅕ of the original). The increased local pH by large current density of trans-CuEn (on carbon-paper support) could play a role in determining its catalytic behavior. Therefore, it seems that it is important to not only start from a high density of closely packed Cu NPs to facilitate the structural transformation, but also have the underlying support provide sufficient surface area. This shows why high $C_2$-$C_3$ selectivity was not observed from the previous report of Cu NP monolayers.

Figure 7A:
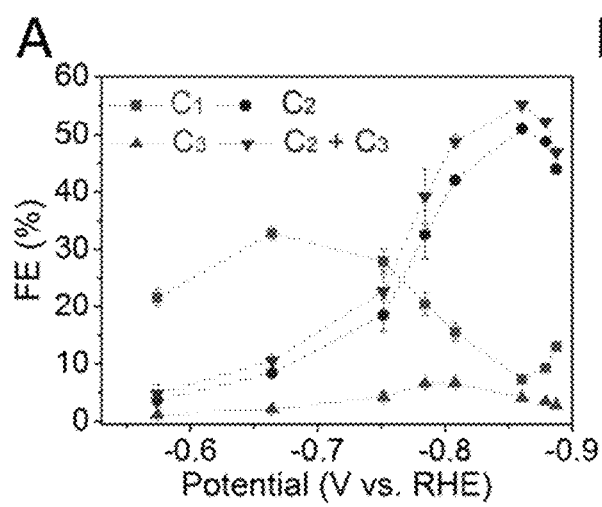
FIGS. 7A and 7B show electrochemical $CO_2$ reduction activity of trans-CuEn.
Figure 7B:
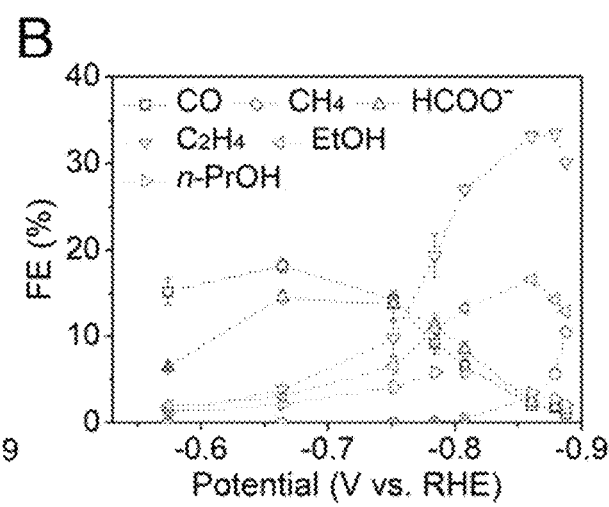

Catalytic activity of trans-CuEn was further probed at various potentials (FIGS. 7A and 7B) in 0.1 M $KHCO_3$. The onset of $C_2$-$C_3$ formation was observed at only −0.57 V vs. RHE, with products mainly comprising $C_2H_4$, EtOH, and n-PrOH. Compared with that of the pristine copper foil, overpotentials were lowered by 180 mV for $C_2H_4$ and 390 mV for EtOH and n-PrOH, respectively. Beyond this potential, a substantial rise in $C_2$-$C_3$ FE was observed, with the highest selectivity toward $C_2$-$C_3$ products (55%) achieved at −0.86 V vs. RHE. The high selectivity for $C_2$-$C_3$ products, including oxygenates, is significant compared with previously reported catalysts for $C_2$-$C_3$ product formation around similar overpotentials applied in neutral pH aqueous media. So far, catalysts for multicarbon products have been Cu-based (mostly derived from oxides or halides) and require bias applied close to and beyond −1 V vs. RHE, where even only some of them reach product distributions dominated by $C_2$-$C_3$ products ($C_2$-$C_3$>$C_1$+$H_2$). Furthermore, with major efforts in the field toward using oxidized Cu as a starting template, the discovery of this catalyst presents an approach to achieving high $C_2$-$C_3$ selectivity for electrochemical $CO_2$ reduction. In contrast, FE for two-electron reduced products (CO and formate) could be lowered to ~1%, implying that almost all of the $CO_2$ interacting with the catalyst could undergo C—C coupling to yield more complex products (FIG. 7B). In assessing catalytic performance for multicarbon product formation, earlier reports have been using $C_2H_4$/$CH_4$ FE ratio as a figure of merit and trans-CuEn exhibits significantly high values at low overpotentials (~252 at −0.78 V vs. RHE) that are comparable or better than previous catalysts reported for selective formation of $C_2H_4$. More negative bias applied leads to increase in $CH_4$ formation and $C_1$ FE.

Figure 8A:
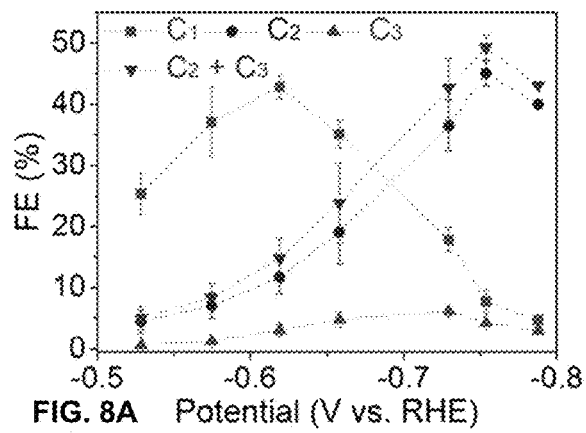
FIGS. 8A-8F show the electrocatalytic behavior of trans-CuEn 2 (×32.5 loading in 0.1 M $CsHCO_3$).
Figure 8B:
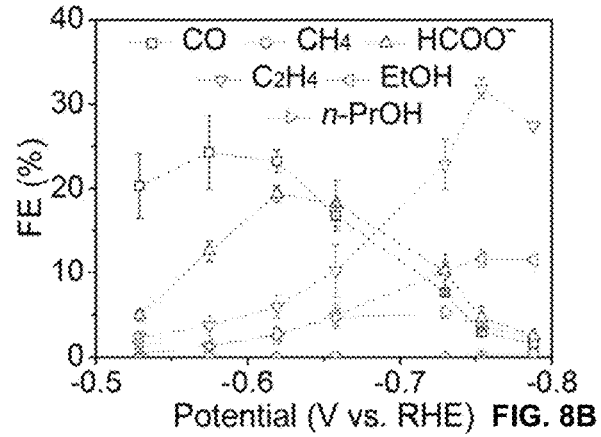
Figure 8C:
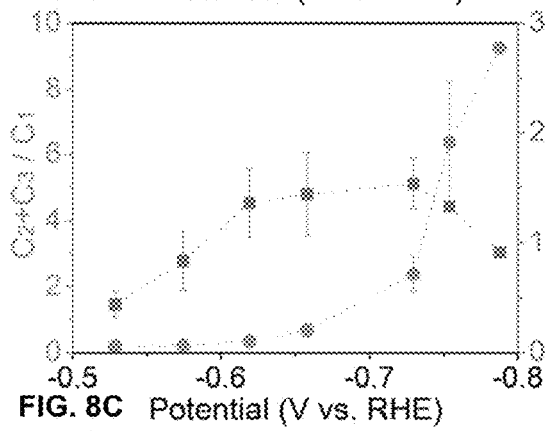

It has been suggested that larger cations promote higher concentrations of $CO_2$ near the catalyst surface, leading to increased activity. For further optimization, Cu NP ensembles were tested in 0.1 M $CsHCO_3$ aqueous electrolyte saturated with 1 atmosphere $CO_2$ and a similar trend was observed where increased loading densities resulted in higher $C_2$-$C_3$ selectivity. Transformation of Cu NP ensembles (at optimized condition of ×32.5 loading in 0.1 M $CsHCO_3$) consistently resulted in cube-shaped particles mixed together with smaller NPs, hereafter referred to as trans-CuEn 2. Activity of trans-CuEn 2 was measured at various potentials (FIGS. 8A-8F). High $C_2$-$C_3$ selectivity was observed at more positive potentials with the onset of $C_2$-$C_3$ formation at only −0.53 V vs. RHE, which is 40 mV less of applied overpotential compared with that observed in 0.1 M $KHCO_3$. Highest $C_2$-$C_3$ selectivity (~50%) was observed at −0.75 V vs. RHE, shifting the potential 110 mV more positive relative to the point of maximum $C_2$-$C_3$ FE in 0.1 M $KHCO_3$. Therefore, with this catalytic structure, selective electrocatalytic conversion $CO_2$ to $C_2$-$C_3$ hydrocarbons and oxygenates could be achieved at significantly reduced overpotentials, compared with what have been demonstrated up to now. Similarly, the main products were $C_2H_4$, EtOH, and n-PrOH (FIG. 8B) constituting up to 95% of total $C_2$-$C_3$ products. In addition, not only were FEs of CO and formate decreased to very low levels (1~2%), but $CH_4$ formation could also be suppressed (<1%) across the entire potential region, resulting in a significantly high $C_2H_4$/$CH_4$ ratio (~2,133 at −0.73 V vs. RHE) at low overpotentials. Owing to its high $C_2$-$C_3$ selectivity in 0.1 M $CsHCO_3$, the proportion of $C_2$-$C_3$ products among the total $CO_2$ reduced products reached up to 90% (FIG. 8C).

Figure 8D:
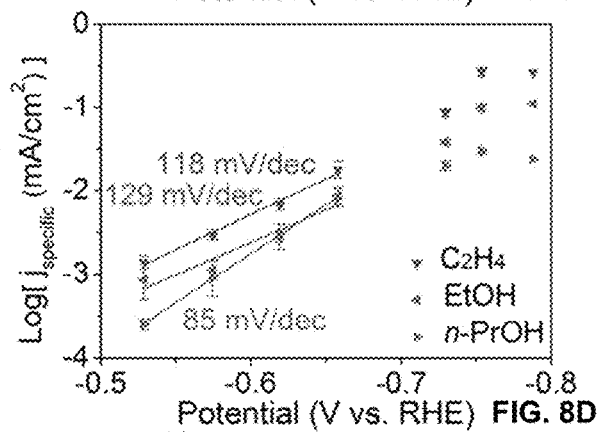

With the real surface area of trans-CuEn 2 measured, specific current density plots and Tafel slopes of the three major products could be obtained (FIG. 8D). Both $C_2H_4$ and EtOH exhibit similar slopes (~120 mV/dec), indicative of a rate-determining step with a common intermediate. Furthermore, $C_2H_4$ and EtOH start forming in the potential region where CO evolution is dominant and increase while CO diminishes (FIGS. 7B and 8B), suggesting that formation of these $C_2$ products is essentially limited by the coupling of major $C_1$ intermediates. It has been also shown that higher coverages of *CO can be expected in the region where CO formation is majorly observed. Therefore, with a slope close to 120 mV/dec suggesting a single electron transfer step, it is expected the rate-determining step to be a reductive coupling (i.e., dimerization) step of adsorbed CO intermediates, predicted from theory and carbon monoxide reduction experiments on copper:

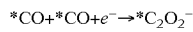

*CO+*CO+$e^-$→*$C_2O_2^-$

On the other hand, n-PrOH exhibits a different slope, suggesting a distinct rate-determining step from that of $C_2$ products. The estimated value is rather close to that observed for $CH_4$ on copper foil (86 mV/dec). In addition, it has been reported that n-PrOH formation only occurs when reactants include both CO (carbon monoxide) and $C_2H_4$, while CO reduction solely leads to EtOH. If $C_3$ products followed the same pathway as $C_2$ products, n-PrOH should have been observed upon CO reduction. Instead, it may be that n-PrOH formation requires coupling between CO and hydrogenated carbon [e.g., carbene (*$CH_2$)], which is a major intermediate in the pathway to $CH_4$. $CH_4$ formation activity of trans-CuEn and -CuEn 2 supports this idea as well (FIGS. 7B and 8B). In contrast to $C_2H_4$ and EtOH, n-PrOH reaches peak selectivity at a more positive potential and the potential in which n-PrOH FE drops coincides well with the point where $CH_4$ FE starts to rise. However, it is still unclear how formation of $C_3$ products occur and an in-depth study of the mechanistic pathways to these products is needed.

Figure 8E:
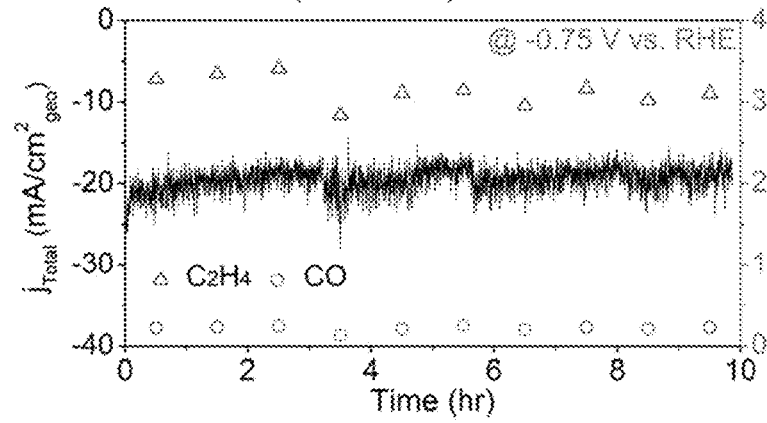
Figure 8F:
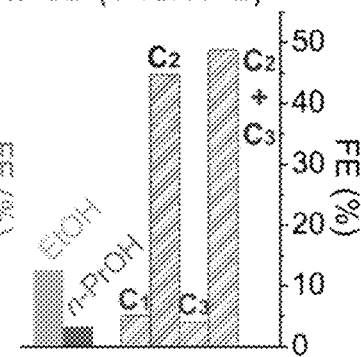

Long-term stability was demonstrated by 10 h electrolysis of trans-CuEn 2 at −0.75 V vs. RHE (FIG. 8E). Average $C_2$-$C_3$ FE reached ~50% for the overall run and structural features of trans-CuEn 2 were maintained as well. Furthermore, stable $C_2$-$C_3$ product current density of 10 $mA/cm^2_{geo}$ was achieved, which is potentially attractive for solar-to-fuel applications. As long-term electrolysis accumulates significant amounts of liquid products, propionaldehyde, likely to be the precursor to n-PrOH, was detected.

Stable and selective $C_2$-$C_3$ product generation achieved by the structurally transformed Cu NP ensembles presents a promising future direction to renewables-powered artificial carbon cycle. Projected solar-to-fuel efficiencies of multicarbon products, assuming combination of commercial Si photovoltaic devices and electrolysis configurations recently demonstrated for effective syngas formation, are comparable or better than natural photosynthesis (e.g., 2.8% for $C_2H_4$). Significant mass activities are achieved as well, desirable in terms of cost-effectiveness, due to extremely low mass ($g_{Cu}$) used compared with other methods that rely on bulk Cu oxidation.

CONCLUSION

As described herein, an ensemble of Cu NPs can enable selective electrocatalytic conversion of $CO_2$ to $C_2$-$C_3$ hydrocarbons and oxygenates at significantly reduced overpotentials. Structural evolution of densely arranged Cu NPs resulted in $C_2$-$C_3$ active nanostructures and experimental investigation of the parameters affecting structural transformation and their catalytic behavior was performed. With the discovery of this active catalytic structure formed in situ, efforts in deepening the understanding of how NPs and atoms within evolve under electrically biased and chemically relevant conditions seem necessary, which will shed light on the key structural features for $CO_2$ conversion to multicarbon products. Furthermore, it is anticipated that the unique approach of using NPs as precursors to an active nanostructured material will lead to a wide expansion of the materials library for various catalytic applications.

Further details regarding the embodiments described herein can be found in Dohyung Kim, Christopher S. Kley, Yifan Li, and Peidong Yang, Copper nanoparticle ensembles for selective electroreduction of $CO_2$ to $C_2$-$C_3$ products, PNAS 2017 114 (40) 10560-10565, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:
1. A method comprising:
 (a) providing a plurality of copper nanoparticles;
 (b) depositing the plurality of copper nanoparticles on a support;
 (c) transforming the plurality of copper nanoparticles to a plurality of copper structures during an operation in which carbon dioxide is reduced, the plurality of copper structures comprising cubes and right rectangular prisms, the plurality of copper nanoparticles on the support being used as a working electrode in an electrochemical cell during the operation; and

(d) generating multicarbon products by reducing carbon dioxide using the copper structures, the multicarbon products consisting of ethylene, ethanol and propanol.

2. The method of claim 1, wherein sides of the cubes and the right rectangular prisms have a length of about 10 nanometers to 75 nanometers.

3. The method of claim 1, wherein copper nanoparticles of the plurality of copper nanoparticles are approximately spherical.

4. The method of claim 1, wherein copper nanoparticles of the plurality of copper nanoparticles have a diameter of about 2 nanometers to 20 nanometers.

5. The method of claim 1, wherein the support comprises carbon paper.

6. The method of claim 5, wherein the carbon paper consists of carbon fibers and plates of graphite.

7. The method of claim 5, wherein the carbon paper consists of carbon fibers.

8. The method of claim 1, wherein a loading of the plurality of copper nanoparticles on the support is about $2.5 \times 10^{11}$ particles per square centimeter (particles/cm$^2$) to $8.2 \times 10^{12}$ particles/cm$^2$.

9. The method of claim 1, wherein (b) comprises drop casting the plurality of copper nanoparticles on the support.

10. A method comprising:
  (a) providing an electrochemical cell, the electrochemical cell including a working electrode comprising a plurality copper nanoparticles deposited on a support;
  (b) reducing carbon dioxide using the electrochemical cell;
  (c) creating a plurality of copper structures on the support, the plurality of copper structures comprising cubes and rectangular prisms, each of the plurality of copper structures comprising a portion of the plurality of copper nanoparticles; and
  (d) generating multicarbon products by reducing carbon dioxide using the electrochemical cell, the multicarbon products consisting of ethylene, ethanol and propanol.

11. The method of claim 10, wherein an electrolyte in the electrochemical cell comprises a bicarbonate.

12. The method of claim 10, wherein (b) comprises applying a step-function of voltage to the working electrode and a counter electrode.

13. The method of claim 10, wherein no voltage is applied to the working electrode and the counter electrode before the step-function of voltage is applied to the working electrode and the counter electrode.

14. The method of claim 10, wherein sides of the cubes and the right rectangular prisms have a length of about 10 nanometers to 75 nanometers.

15. The method of claim 10, wherein copper nanoparticles of the plurality of copper nanoparticles are approximately spherical.

16. The method of claim 10, wherein copper nanoparticles of the plurality of copper nanoparticles have a diameter of about 2 nanometers to 20 nanometers.

17. The method of claim 10, wherein the support comprises carbon paper.

18. The method of claim 10, wherein a loading of the plurality of copper nanoparticles on the support is about $2.5 \times 10^{11}$ particles per square centimeter (particles/cm$^2$) to $8.2 \times 10^{12}$ particles/cm$^2$.

19. The method of claim 1, wherein an electrolyte in the electrochemical cell comprises a bicarbonate.

20. The method of claim 1, wherein (c) comprises applying a step-function of voltage to the working electrode and a counter electrode of the electrochemical cell.

* * * * *